United States Patent [19]

Beavers

[11] Patent Number: 5,177,130
[45] Date of Patent: Jan. 5, 1993

[54] RUBBERIZED CHEMICAL EMULSION

[76] Inventor: Paul E. Beavers, 1401 Lakeshore Dr., Yukon, Okla. 73099

[21] Appl. No.: 749,084

[22] Filed: Aug. 23, 1991

[51] Int. Cl.$^5$ ............................................. C08L 95/00
[52] U.S. Cl. ........................................ 524/60; 524/61
[58] Field of Search .................................... 524/60, 61

[56] References Cited

U.S. PATENT DOCUMENTS

| | | | |
|---|---|---|---|
| 3,868,263 | 2/1975 | McConnaughay | 106/281 |
| 4,069,182 | 1/1978 | McDonald | 260/28.5 |
| 4,166,049 | 8/1979 | Huff | 260/2.3 |
| 4,492,781 | 1/1985 | Duszak et al. | 524/59 |
| 4,503,176 | 3/1985 | Barlow et al. | 524/62 |
| 4,511,679 | 4/1985 | Ariyoshi et al. | 521/83 |
| 4,609,696 | 9/1986 | Wilkes | 524/59 |
| 4,626,562 | 12/1986 | Motomura et al. | 523/466 |
| 4,822,425 | 4/1989 | Burch | 106/273.1 |
| 4,992,492 | 2/1991 | Sainton | 524/62 |

FOREIGN PATENT DOCUMENTS

| | | | |
|---|---|---|---|
| 0080928 | 6/1983 | European Pat. Off. | 524/60 |
| 0321496 | 11/1971 | U.S.S.R. | 524/60 |

OTHER PUBLICATIONS

BASF Corporation, Technical Data Sheet; Butonal NS 120, 1-4 (1988).
Harcos Chemicals, Inc., Material Safety Data Sheet; Caustic Soda.
Jetco Chemicals, Material Safety Date Sheet; Jetco AE-80, 1-3.
Westvaco, Material Safety Data Sheet; Indulin AQ-S-1M, (1988).

*Primary Examiner*—Paul R. Michl
*Assistant Examiner*—LaVonda R. DeWitt
*Attorney, Agent, or Firm*—Dunlap, Codding & Lee

[57] ABSTRACT

A rubberized chemical emulsion having rubber added to an anionic material after the anionic material has passed through a colloid mill.

25 Claims, No Drawings

RUBBERIZED CHEMICAL EMULSION

FIELD OF THE INVENTION

The present invention relates generally to rubberized chemical emulsions and more particularly, to emulsions for constructing, sealing and rejuvenating bituminous surfaces.

SUMMARY OF THE INVENTION

Bituminous materials have been used extensively in the past to create roads, cover roofs and in many other applications. As these materials age, they lose some of the properties which make them suitable for their application. For example, bituminous or asphalt roads lose their flexibility and begin to crack and break up. Removing and replacing these aged asphaltic materials is an expensive and labor extensive project.

The emulsions which are commonly used to rejuvenate, seal or patch bituminous materials have also been the source of many problems. For example, a patch made from prior materials often would breakup, track, or roll up on tires. One result of the use of prior emulsions was that the same spot may constantly need repair.

This invention provides emulsions for the construction and maintenance of bituminous surfaces including rejuvenating, sealing and patching existing surfaces. The novel emulsions may be prepared by adding rubber and an aliphatic polycarboxylic acid solution to an anionic material. In a preferred embodiment water is added to extend the emulsion.

Some of the many advantages of this emulsion over those disclosed in the prior art include: greater bleed resistance, tracking resistance, and the material is less likely to roll up on vehicle tires. In addition, the emulsion saves energy in at least two ways. First, since the emulsion may be extended with the addition of water instead of requiring oil, less hydrocarbons are used in making the emulsion. Second, the emulsion of this invention has sticking quality and covers more square feet per gallon than prior emulsions.

DETAILED DESCRIPTION OF THE PREFERRED EMBODIMENTS

The present invention comprises an emulsion having an anionic material with rubber added.

The anionic material preferably comprises; asphalt, fatty acid, water and a base. Preferably the asphalt comprises 35% to 75% and more preferably 66% to 70%, by weight, of the anionic material. The fatty acid is preferably about 0.5% to 1.5% and more preferably about 1%, by weight, of the anionic material. The fatty acid, water and base are mixed such that the mixture preferably has a pH of from 9 to 13.

Many different asphalts may be used to make the anionic material of this invention, however, one example of a suitable asphalt is 120/150 sp. blend commercially available from Total Asphalt in Ardmore, OK.

The fatty acid is preferably a tall oil. A suitable tall oil may be purchased from JETCO CHEMICALS, of Corsicana, TX, under the trade name JETCO AE-80. Another suitable fatty acid is sold under the trade name INDULIN AQS-1M which may be purchased from Westvaco, Charleston Heights, SC.

The base is preferably a strong base which will produce a Ph in the fatty acid/water/base mixture of about 9 to 13. One suitable base is sodium hydroxide, which may be purchased from HARCOS CHEMICALS INC., of Kansas City, KS, under the product name CAUSTIC SODA LIQUID 50%.

The weight of the rubber added has a weight equal to about 1% to 10% of the weight of the anionic material. The rubber is preferably in liquid form and more preferably a liquid styrene/butadiene dispersion, such as BUTONAL NS 120 which may be purchased from the BASF Corporation Chemicals Division, Parsippany, NJ. In one preferred embodiment of the invention the weight of the rubber added is more preferably equal to about 5% to 6% of the anionic material, in another preferred embodiment the weight of the rubber added is equal to about 4% to 6% of the weight of the anionic material, and in another preferred embodiment the weight of the rubber added is equal to about 2% to 4% and most preferably about 3% of the weight of the anionic material.

The weight of aliphatic polycarboxylic acid added is preferably equal to as much as 1.8%, and more preferably about 0.8%, of the weight of the anionic material. The aliphatic polycarboxylic acid preferably has a boiling point of about 212° F., a flash point of more than 300° F. and a pH of about 8. A suitable aliphatic polycarboxylic acid is INDULIN AQS-1M which may be purchased from Westvaco, Charleston Heights, SC.

In some applications it is preferable to add additional water to the anionic material/rubber/aliphatic polycarboxylic acid mixture. For example, if the emulsion is to be used as a rejuvenator or a seal coating, it is often desirable to add water to extend the emulsion. Preferably the additional water is added after the other additives have been added, that is after the rubber and aliphatic polycarboxylic acid has been added. The weight of additional water which may be added is up to about 55%, and more preferably about 30%, of the weight of the anionic material/additive mixture/additional water combined. If the weight of the additional water is over about 50% of the weight of the anionic material/additive mixture/additional water combined, then a stabilizing agent, such as a lignin, is preferably added to help prevent breaking of the emulsion. One suitable stabilizing agent is INDULIN "C" commercially available from Westvaco in Charleston Heights, SC. If a stabilizing agent like INDULIN "C" is used, it is preferably mixed with a sufficient quantity of cold water to disperse the stabilizing agent before it is added to the anionic material. Preferably the weight of the stabilizing agent added is equal to about 0.5% to 1.0% of the weight of the anionic material.

To help prevent breaking of the emulsion, the additional water is preferably heated to generally the same temperature as the anionic material/additive mixture. In most cases it is not necessary to heat the additional water. However, as the amount of water is increased, the potential for the breaking of the emulsion is also increased. In addition, if no stabilizing agent is used, the potential for breaking the solution is increased. Therefore, the additional water is preferably at generally the same temperature as the anionic material/additive mixture.

In each of the preferred embodiments the anionic material may be made in the same way. One suitable way of making the anionic material is described below.

Preferably the asphalt is added to a first container and heated to at least 270° F. The fatty acid, water and base are added to a second container and heated to about 100° F. The contents of the two containers are then passed through a colloid mill to produce the anionic material. The anionic material should be less than 212° F. and most preferably about 185° F. when it exits the colloid mill. In this way water loss due to boiling is eliminated. The anionic material may piped directly from the colloid mill to a third container.

Certain additives are added to the anionic material to make the rubberized chemical emulsion of this invention. In particular rubber is added and generally a aliphatic polycarboxylic acid is added, and in one embodiment additional water is added. The first preferred embodiment is a rubberized chemical emulsion which may be used for rejuvenating or seal coating bituminous surfaces. The second preferred embodiment is a rubberized chemical emulsion which may be used as a chip or patch material. The third preferred embodiment is a rubberized chemical emulsion which may be used use as a roof material.

In the first preferred embodiment the aliphatic polycarboxylic acid should be added, and in the other two preferred embodiments the aliphatic polycarboxylic acid may be added. As stated before the weight of the aliphatic polycarboxylic acid added in all embodiments is most preferably 0.8% of the weight of the anionic material. If the chemical emulsion is to be used as a chip or patch material, or a roofing material the aliphatic polycarboxylic acid may be left out, however, a superior emulsion will result if the aliphatic polycarboxylic acid is added. If the emulsion is to be used as a rejuvenator or seal coating the aliphatic polycarboxylic acid should be added to the anionic material. The aliphatic polycarboxylic acid is added by placing the desired weight of aliphatic polycarboxylic acid into the third container with the anionic material.

The preferable amount of rubber added to the third container is about 1% to 10% of the weight of the anionic material. However, the most preferable amount of rubber varies with the desired application of the emulsion. For example, if the emulsion is to be used as a rejuvenator or a seal coating the weight of rubber added is most preferably equal to about 5% to 6% of the weight of the anionic material. In this way the material will set up and not bleed back or pick up. Similarly, if the emulsion is to be used as a roofing material the weight of rubber added is most preferably equal to about 4% to 6% of the weight of the anionic material. On the other hand, if the emulsion is to be used as a chip or patch material the weight of rubber added is more preferably equal to about 2% to 4%, and most preferably about 3%, of the weight of the anionic material. About 3% rubber will increase the sticking power to hold rock used in the patch or chipping process and not bleed back.

If the emulsion is to be used as a rejuvenator or seal coating water may be added to extend the emulsion. To add the additional water, the water is preferably heated to about the same temperature as the anionic material/additive mixture and then added to the anionic material/additive mixture in the third container. If a Indulin "C" is used as a stabilizing agent, the Indulin "C" is added to a sufficient quantity of water to substantially disperse the powder and then the water/Indulin "C" is added to the third container with the anionic material/additive mixture.

The invention is further illustrated by the following examples which are illustrative of the preferred embodiments and are not intended as limiting the scope of the appended claims.

EXAMPLE OF MAKING ANIONIC MATERIAL

A 1000 pounds of anionic material may be made by the following steps.

Place 670 pounds of 120/150 sp. blend asphalt from Total Asphalt in Ardmore, OK, in a first container and heat to at least 270° F.

Place 10 pounds of Jetco AE-80 purchased from JETCO CHEMICALS of Corsicana, TX, in a second container, and then add water and sodium hydroxide to the second container until the total weight of the contents of the second container is 330 pounds, and the pH of the contents of the second container is between 9 and 13. Then heat the contents of the second container to about 100° F.

Pass the contents of the first container and the second container through a colloid mill to produce the anionic material. The colloid mill should be set so that the anionic material has a temperature of about 185° F. when it exits the mill. The anionic material should be piped from the colloid mill to a third container.

EXAMPLE OF FIRST PREFERRED EMBODIMENT

The invention is further illustrated by the following example which is illustrative of the first preferred embodiment and is not intended as limiting the scope of the appended claims. To make a suitable rejuvenator or seal coating emulsion, the following are added to 1,000 lbs. of the anionic material in the third container: 55 pounds of rubber (i.e. 55 lbs.=5.5%×1000 lbs.); 8 pounds of AQS-1M (8 lbs.=0.8%×1000 lbs.); and 455.57 pounds of water (i.e. $[(1000+55+8) \div 0.7] - (1000+55+8)$ or 0.3 of the weight of the resulting emulsion).

To use the above described emulsion as a rejuvenator or seal coating, the emulsion is spread over an existing surface. For example, the emulsion may be sprayed on a road. When prepared as described above, about 2,000 gallons will rejuvenate or seal a mile of a typical twenty-two foot wide road.

EXAMPLE OF SECOND PREFERRED EMBODIMENT

The invention is further illustrated by the following example which is illustrative of the second preferred embodiment and is not intended as limiting the scope of the appended claims. to make an emulsion for chipping or patching, the following are added to the anionic material in the third container: 25 pounds of rubber (i.e. 25 lbs.=3%×1000 lbs.); and 8 pounds of AQS-1M (8 lbs.=0.8% ×1000 lbs.).

The above described emulsion may be used as a patch material for existing surfaces such as roads. In use, the emulsion is spread over the area needing a patch. Then clean fractured rock is spread over the emulsion. This process may be repeated as many times as necessary to bring the patch up to the level of the existing road. Since the emulsion has rejuvenation properties, it is not necessary to cut and remove existing material before applying the emulsion. However, if the old materials extend substantially above the grade of the existing surface, some of the old material should be removed. In this way, the patch will not protrude above the existing surface. An alternate method for using this emulsion for patching is to mix fractured rock with the emulsion and then apply the emulsion/rock mixture to the area needing a patch. In addition, cutback agents may be added to the emulsion/rock material so it may be stockpiled for future use.

To use the above described emulsion as a chip material, the emulsion is coated over a surface and then chip, i.e. rock, is spread over the emulsion. When the emulsion is used as a chip material, about 2,500 to 3,000 gallons will treat a mile of a typical twenty-two foot wide road.

EXAMPLE OF THIRD PREFERRED

The invention is further illustrated by the following example which is illustrative of the third preferred embodiment and is not intended as limiting the scope of the appended claims. To make an emulsion for roofing the following are added to the anionic material in the third container: 50 pounds of rubber (i.e. 50 lbs = 5.0% × 1000 lbs.); and 8 pounds of AQS-1M (8 lbs. = 0.8% × 1000 lbs.).

The above described invention may be used on flat top roofs and on asphaltic or tar roofs. In addtion, the emuslsion may be used with many materials or combinations of materials to provide a seal. For example: rubber, plastic, metal, concrete and POLYGUARD (which may be purchased from Polyguard, Denton, TX) are but a few materials which may be coated and sealed with the emulsions of this invention.

The emulsion described in this invention may be used in a variety of other applications which would be obvious to those skilled in the art. The uses described in this specification are meant to be illustrative only and are not ment to be limiting or as a list of all possible uses.

Changes may be made in the embodiments of the invention described herein or in parts or elements of the embodiments described herein or in the steps of the methods described herein without departing from the spirit and scope of the invention as defined in the following claims.

What is claimed is:

1. A method for making a rubberized chemical emulsion comprising the steps of:
   adjusting the temperature of an anionic material to less than 212° F., wherein the anionic material comprises; 35% to 75%, by weight, asphalt, 0.5% to 1,5%, by weight, fatty acid, water, and a base;
   adding rubber and an aliphatic polycarboxylic acid solution to the anionic material, wherein the weight of the rubber is equal to from 1% to 10% of the weight of the anionic material, and wherein the weight of the aliphatic polycarboxylic acid solution is equal to from 0.0% to 1.8% of the weight of the anionic material.

2. The method of claim 1 wherein the aliphatic polycarboxylic acid solution has a boiling point of about 212° F., a flash point of above 300° F. and a pH of about 8.

3. The method of claim 2 wherein the weight of the aliphatic polycarboxylic acid solution is equal to about 0.8% of the weight of the anionic material.

4. The method of claim 1 further comprising, adding additional water to the anionic material/rubber/aliphatic polycarboxylic acid solution, wherein the weight of the water added is less than 55% of the weight of the anionic material/rubber/aliphatic polycarboxylic acid solution/water combined.

5. The method of claim 4 wherein the additional water is at about the same temperature as the anionic material/rubber/aliphatic polycarboxylic acid solution.

6. The method of claim 4 further comprising, adding a sufficient amount of lignin to prevent the anionic material/rubber/aliphatic polycarboxylic acid solution/water from breaking.

7. The method of claim 1 wherein the weight of the rubber added is equal to from 5% to 6% of the weight of the anionic material.

8. The method of claim 1 wherein the weight of the rubber is equal to from 2% to 4% of the weight of the anionic material.

9. The method of claim 1 wherein the rubber is a styrene/butadiene dispersion.

10. The method of claim 1 wherein the fatty acid is tall oil.

11. A chemical emulsion made by a process comprising the steps of:
    adjusting the temperature of an anionic material to less than 212° F., wherein the anionic material comprises; 35% to 75%, by weight, asphalt, 0.5% to 1,5%, by weight, fatty acid, water, and a base;
    adding rubber and an aliphatic polycarboxylic acid solution to the anionic material, wherein the weight of the rubber is equal to from 1% to 10% of the weight of the anionic material, and wherein the weight of the aliphatic polycarboxylic acid solution is equal to from 0.0% to 1.8% of the weight of the anionic material.

12. The chemical emulsin of claim 11 wherein the process further comprises, adding additional water to the anionic material/rubber/aliphatic polycarboxylic acid solution, wherein the weight of the water added is less than 55% of the weight of the anionic material/rubber/aliphatic polycarboxylic acid solution/water combined.

13. A method for sealing bituminous surfaces comprising the steps of:
    making a rubberized chemical emulsion comprising the steps of;
    adjusting the temperature of an anionic material to less than 212° F., wherein the anionic material comprises; 35% to 75%, by weight, asphalt, 0.5% to 1,5%, by weight, fatty acid, water, and a base;
    adding rubber and an aliphatic polycarboxylic acid solution to the anionic material, wherein the weight of the rubber is equal to from 1% to 10% of the weight of the anionic material, and wherein the weight of the aliphatic polycarboxylic acid solution is equal to from 0.0% to 1.8% of the weight of the anionic material; and
    applying the chemical emulsion over a bituminous surface.

14. The method of claim 1 wherein the weight of the aliphatic polycarboxylic acid solution is equal to from about 0.5% to 1.0% of the weight of the anionic material.

15. The chemical emulsion of claim 11 wherein the weight of the aliphatic polycarboxylic acid solution added is equal to from about 0.5% to 1.0% of the weight of the anionic material.

16. The chemical emulsion of claim 11 wherein the weight of the aliphatic polycarboxylic acid solution added is equal to about 0.8% of the weight of the anionic material.

17. The chemical emulsion of claim 12 wherein the water added is at about the same temperature as the anionic material/rubber/aliphatic polycarboxylic acid solution.

18. The chemical emulsion of claim 11 wherein the weight of the rubber added is equal to from 5% to 6% of the weight of the anionic material.

19. The chemical emulsion of claim 11 wherein the rubber is a styrene/butadiene dispersion.

20. The method of claim 13 wherein the weight of the aliphatic polycarboxylic acid solution added is equal to from about 0.5% to 1.0% of the weight of the anionic material.

21. The method of claim 13 wherein the weight of the aliphatic polycarboxylic acid solution is equal to about 0.8% of the weight of the anionic material.

22. The method of claim 13 further comprising, adding additional water to the anionic material/rubber/aliphatic polycarboxylic acid solution, wherein the weight of the water added is less than 55% of the weight of the anionic material/rubber/aliphatic polycarboxylic acid solution/water combined.

23. The method of claim 22 wherein the additional water is at about the same temperature as the anionic material/rubber/aliphatic polycarboxylic acid solution.

24. The method of claim 13 wherein the weight of the rubber added is equal to from 5% to 6% of the weight of the anionic material.

25. The method of claim 24 wherein the rubber is a styrene/butadiene dispersion.

* * * * *

UNITED STATES PATENT AND TRADEMARK OFFICE
CERTIFICATE OF CORRECTION

PATENT NO. : 5,177,130
DATED : January 5, 1993
INVENTOR(S) : Paul E. Beavers

It is certified that error appears in the above-identified patent and that said Letters Patent is hereby corrected as shown below:

```
Column 5, line 10, after "PREFERRED", insert --EMBODIMENT--.

Column 5, line 20, change "addtion" to --addition--.

Column 5, line 21, change "emuslsion" to --emulsion--.

Column 5, line 30, change "ment" to --meant--.

Column 5, line 44, change "1,5" to --1.5--.

Column 6, line 20, change "1,5" to --1.5--.

Column 6, line 28, change "emulsin" to --emulsion--.

Column 6, line 42, change "1,5" to --1.5--.
```

Signed and Sealed this

Fourth Day of May, 1993

*Attest:*

MICHAEL K. KIRK

*Attesting Officer*     Acting Commissioner of Patents and Trademarks